(12) United States Patent
Dunn

(10) Patent No.: US 11,535,168 B2
(45) Date of Patent: Dec. 27, 2022

(54) LADDER-MOUNTED STORAGE SYSTEM

(71) Applicant: Donald Dunn, Colfax, CA (US)

(72) Inventor: Donald Dunn, Colfax, CA (US)

(*) Notice: Subject to any disclaimer, the term of this patent is extended or adjusted under 35 U.S.C. 154(b) by 8 days.

(21) Appl. No.: 17/329,494

(22) Filed: May 25, 2021

(65) Prior Publication Data

US 2022/0379816 A1  Dec. 1, 2022

(51) Int. Cl.
*B60R 9/06* (2006.01)
(52) U.S. Cl.
CPC ................... *B60R 9/065* (2013.01)
(58) Field of Classification Search
CPC .................. B60R 9/065; B60R 2011/0059
USPC ........... 224/558, 511; 248/210, 229.1, 227.3, 248/227.4, 309.2
See application file for complete search history.

(56) References Cited

U.S. PATENT DOCUMENTS

| | | | | |
|---|---|---|---|---|
| 3,246,867 A * | 4/1966 | Lee | ........................... | E06C 7/14 248/314 |
| 3,451,580 A * | 6/1969 | Husby | ..................... | A62C 13/78 220/4.24 |
| 4,241,858 A * | 12/1980 | Lawroski | ................ | B60R 9/065 224/532 |
| 4,671,439 A * | 6/1987 | Groeneweg | ............. | B60R 9/065 224/527 |
| 4,771,926 A * | 9/1988 | Anderson | ............... | B60R 9/065 224/527 |
| 4,957,228 A * | 9/1990 | Balka | ...................... | B60R 9/065 224/493 |
| 5,038,983 A * | 8/1991 | Tomososki | ............. | B60R 9/065 224/527 |
| 5,314,101 A * | 5/1994 | White | ..................... | B60R 9/065 224/527 |
| 5,620,123 A * | 4/1997 | Brisbois | .................. | B60R 9/065 224/511 |
| 5,622,345 A * | 4/1997 | Hopkins | ................. | B60R 9/048 248/231.51 |
| 5,853,156 A * | 12/1998 | Moore | ...................... | E06C 7/14 224/558 |
| 5,901,891 A * | 5/1999 | Douglass | ................. | A61G 5/10 224/558 |
| 6,401,994 B1 * | 6/2002 | Ham | ......................... | B60R 7/14 109/51 |
| 6,425,510 B1 * | 7/2002 | King | ....................... | B60R 9/065 D12/423 |
| 6,761,296 B2 * | 7/2004 | Ford | ....................... | B60R 9/055 224/310 |
| 6,845,895 B2 * | 1/2005 | Jones | ....................... | A45C 9/00 224/330 |
| 7,044,344 B2 * | 5/2006 | Winkler | ................. | A63B 71/00 224/511 |

(Continued)

FOREIGN PATENT DOCUMENTS

| | | | | |
|---|---|---|---|---|
| DE | 29621239 U1 * | 2/1997 | .......... | A63C 11/028 |
| DE | 29712372 U1 * | 9/1997 | ............. | B60R 9/065 |

(Continued)

*Primary Examiner* — Justin M Larson
(74) *Attorney, Agent, or Firm* — The Iwashko Law Firm, PLLC; Lev Ivan Gabriel Iwashko

(57) ABSTRACT

A ladder-mounted storage system, including a ladder-mounted storage container to store at least one item therein; and a plurality of ladder-mount assemblies to removably connect to a ladder of a vehicle and receive the ladder-mount storage container thereon.

17 Claims, 16 Drawing Sheets

(56) References Cited

U.S. PATENT DOCUMENTS

| | | | | |
|---|---|---|---|---|
| 7,416,160 B2* | 8/2008 | Cies | ............... | B65F 1/1615 |
| | | | | 220/283 |
| 8,205,773 B2* | 6/2012 | Timmer | ............... | B60R 11/00 |
| | | | | 224/400 |
| 8,820,598 B2* | 9/2014 | Tennyson | ............... | B60R 9/065 |
| | | | | 224/532 |
| 9,616,820 B2* | 4/2017 | Raley | ............... | B60R 9/065 |
| 10,112,546 B1* | 10/2018 | Hall | ............... | B60R 9/065 |
| 10,343,615 B2* | 7/2019 | Bonenberger | ......... | B62D 21/14 |
| 10,426,081 B2* | 10/2019 | Biers, Sr. | ............... | B60R 9/06 |
| 10,611,312 B1* | 4/2020 | Sullivan | ............... | B60D 1/58 |
| 10,829,056 B2* | 11/2020 | Pratka | ............... | B60R 9/06 |
| 11,155,218 B2* | 10/2021 | Morris | ............... | B60R 11/06 |
| 2001/0048011 A1* | 12/2001 | Burns | ............... | B60R 9/065 |
| | | | | 224/511 |
| 2003/0160140 A1* | 8/2003 | Nastase | ............... | E06C 7/14 |
| | | | | 248/210 |
| 2004/0178242 A1* | 9/2004 | Moreau | ............... | B60R 9/065 |
| | | | | 224/282 |
| 2009/0101685 A1* | 4/2009 | Robb | ............... | B60R 9/065 |
| | | | | 224/548 |
| 2009/0272754 A1* | 11/2009 | Timmer | ............... | F41H 7/00 |
| | | | | 224/567 |
| 2010/0051627 A1* | 3/2010 | Kucks | ............... | B60R 9/065 |
| | | | | 220/592.03 |
| 2010/0122994 A1* | 5/2010 | Chuang | ............... | B62J 9/21 |
| | | | | 224/558 |
| 2012/0292357 A1* | 11/2012 | Tennyson | ............... | B60R 9/06 |
| | | | | 224/521 |
| 2022/0111797 A1* | 4/2022 | Plaksin | ............... | B60R 9/065 |

FOREIGN PATENT DOCUMENTS

| | | | | |
|---|---|---|---|---|
| DE | 19650817 A1 * | 6/1998 | ............ | B60R 9/065 |
| DE | 10042056 A1 * | 4/2002 | ............ | B60R 9/065 |
| DE | 202018002567 U1 * | 2/2019 | | |
| EP | 2845769 B1 * | 2/2018 | ............ | B60R 9/065 |

* cited by examiner

LADDER-MOUNTED STORAGE SYSTEM

BACKGROUND

1. Field

The present general inventive concept relates generally to a storage container, and particularly, to a ladder-mounted storage system.

2. Description of the Related Art

Recreational vehicles (RV) are large vehicles with different facilities for sleeping, cooking, and toiletries. RVs are often used to provide living accommodations during travel. However, some people use RVs for a full-time residence because it is a cheaper option than home ownership, as well as, offers a nomadic lifestyle.

Although large in size, RVs have limited space for storage and present a challenge for people with multiple occupants and/or items. Typically, an owner of the RV will have to install drawers, pocket organizers, magnets, and/or adhesives (e.g., attachments to walls) to increase storage space. Unfortunately, these items just add additional clutter within the RV.

Another consideration is using an external storage unit on a roof of the RV. Yet, placing the external storage unit on the roof is unstable and difficult to secure. Moreover, the roof requires the owner and/or another user to climb up onto the roof of the RV before the external storage unit can be retrieved. As such, a person climbing up on the roof risks injury.

Therefore, there is a need for a ladder-mounted storage system that provides a secure storage option and accommodates different types of items.

SUMMARY

The present general inventive concept provides a ladder-mounted storage system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a ladder-mounted storage system, including a ladder-mounted storage container to store at least one item therein; and a plurality of ladder-mount assemblies to removably connect to a ladder of a vehicle and receive the ladder-mount storage container thereon.

The ladder-mounted storage container may include a first section, and a second section hingedly disposed on at least a portion of the first section to move from closed in a first position to at least partially opened in a second position, and move from opened in the second position to closed in the first position.

The first section may include a plurality of latch receiving surfaces disposed on at least a portion of the first section, a lock receiving aperture disposed on at least a portion of at least one of the plurality of latch receiving surfaces, and a plate receiving recess disposed on at least a portion of a rear side of the first section, such that the plate receiving recess is recessed with respect to an outer surface of the rear side of the first section and each edge of the first section surrounding the rear side of the first section.

The ladder-mounted storage container may further include a plurality of latches disposed on at least a portion of the second section to connect to the plurality of latch receiving surfaces.

At least one of the plurality of latches may include a lock to connect to the lock receiving aperture, such that the lock prevents the second section from opening until the lock is unlocked.

The ladder-mounted storage container may include a mount lock aperture disposed on least a portion of the ladder-mounted storage container to pass from an outer surface to an interior surface thereof.

Each of the plurality of ladder-mount assemblies may include a front section, and a rear section removably connected to at least a portion of the front section.

The front section may include a plate receiving groove disposed on at least a portion of the front section, a plurality of fastener receiving apertures disposed on at least a portion of the front section, and a plurality of mount fasteners to removably insert within at least one of the plurality of fastener receiving apertures.

The rear section may include another plate receiving groove disposed on at least a portion of the rear section, another plurality of fastener receiving apertures disposed on at least a portion of the rear section, each of the another plurality of fastener receiving apertures to receive at least one of the plurality of mount fasteners therein through the plurality of fastener receiving apertures, and a knob receiving aperture disposed on at least a portion of the rear section.

Each of the plurality of ladder-mount assemblies may further include a plurality of mounting plates removably disposed on at least a portion of the plate receiving groove and the another plate receiving groove, an adjustment knob removably connected to the knob receiving aperture to rotate in a first rotating direction toward the plurality of mounting plates to increase tension of the plurality of mounting plates against the rail of the ladder, and to rotate in a second rotating direction away from the plurality of mounting plates to decrease tension of the plurality of mounting plates against the rail of the ladder, and a knob pad disposed on at least a portion of the rear section and an end of the knob receiving aperture to absorb an impact from the adjustment knob in response to contact from the adjustment knob.

Each of the plurality of ladder-mount assemblies may further include an extension body perpendicularly disposed away from the front section with respect to a first direction to extend a predetermined length away from the front section, and a mounting rod perpendicularly disposed away from the extension body with respect to a second direction different from the first direction, such that the mounting rod is disposed in parallel with respect to the front section and the rear section.

The mounting rod may include a lock groove disposed on at least a portion of the mounting rod.

The ladder-mounted storage system may further include a back plate to be disposed on at least a portion of a rear side of the ladder-mounted storage container.

The back plate may include a plate body, a plurality of rod receiving grooves disposed on at least a portion of the plate body, each of the plurality of rod receiving grooves to receive the mounting rod therein, and a mount lock groove disposed on at least a portion of the plate body to receive the mounting rod and the lock groove therethrough.

The mount lock groove may include a protrusion aperture disposed on an end of the mount lock groove to receive an end of the mounting rod and the lock groove therethrough, and a seal removably disposed within at least a portion of the protrusion aperture to prevent damage within the protrusion aperture and the mount lock groove.

The back plate may further include a mount lock cap removably connected to at least a portion of the mount lock groove and accessible within the ladder-mounted container storage via the mount lock aperture to lock within the lock groove and prevent the mounting rod from being removed until the mount lock cap is unlocked.

The ladder-mounted storage system may further include a rear barrier disposed within at least a portion of the ladder-mounted storage container to absorb an impact to the ladder-mounted storage container during mounting.

The ladder-mounted storage container may include a plurality of mesh surfaces disposed on least a portion of the ladder-mounted storage container to facilitate movement of air therethrough.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
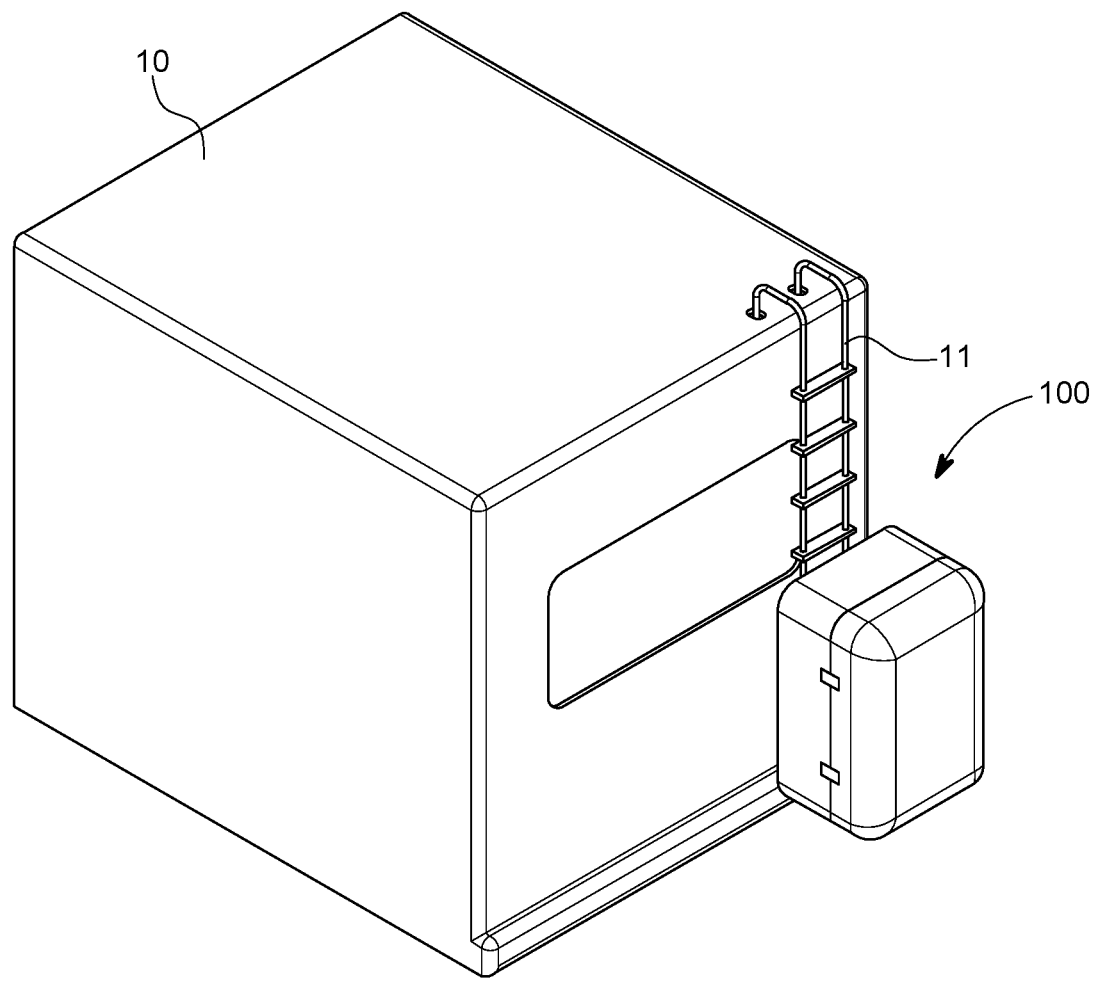
FIG. 1 illustrates an isometric view of a ladder-mounted storage system as disposed on a ladder of a vehicle, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Ladder-Mounted Storage System 100
Ladder-Mounted Storage Container 110

First Section 111
Latch Receiving Surfaces 111a
Lock Receiving Aperture 111b
Plate Receiving Recess 111c
Second Section 112
Latches 113
Lock 113a
Mount Lock Aperture 114
Ladder-Mount Assembly 120
Front Section 121
Plate Receiving Groove 121a
Fastener Receiving Apertures 121b
Mount Fasteners 121c
Rear Section 122
Plate Receiving Groove 122a
Fastener Receiving Apertures 122b
Knob Receiving Aperture 122c
Extension Body 123
Mounting Rod 124
Lock Groove 124a
Mounting Plates 125
Adjustment Knob 126
Knob Pad 127
Back Plate 130
Plate Body 131
Rod Receiving Grooves 132
Tool Receiving Aperture 132a
Rod Cap 132b
Cap Recess 132b1
Mount Lock Groove 133
Protrusion Aperture 133a
Seal 133b
Mount Lock Cap 134
Cap Body 134a
Lock 134b
Cap Aperture 134c
Rear Barrier 140
Foam Body 141
Mount Receiving Apertures 142
Ladder-Mounted Storage Container 210
First Section 211
Latch Receiving Surfaces 211a
Lock Receiving Aperture 211b
Plate Receiving Recess 211c
Second Section 212
Latches 213
Lock 213a
Mesh Surfaces 214
Shelf 215
Shelf Receiving Notches 216

FIG. 1 illustrates an isometric view of a ladder-mounted storage system 100 as disposed on a ladder 11 of a vehicle 10, according to an exemplary embodiment of the present general inventive concept.

The ladder-mounted storage system 100 may be constructed from at least one of metal, plastic, wood, ceramic, glass, vinyl, canvas, and rubber, etc., but is not limited thereto. Additionally, the ladder-mounted storage system 100 may be highly durable, weatherproof, waterproof, and/or fireproof.

Figure 2:
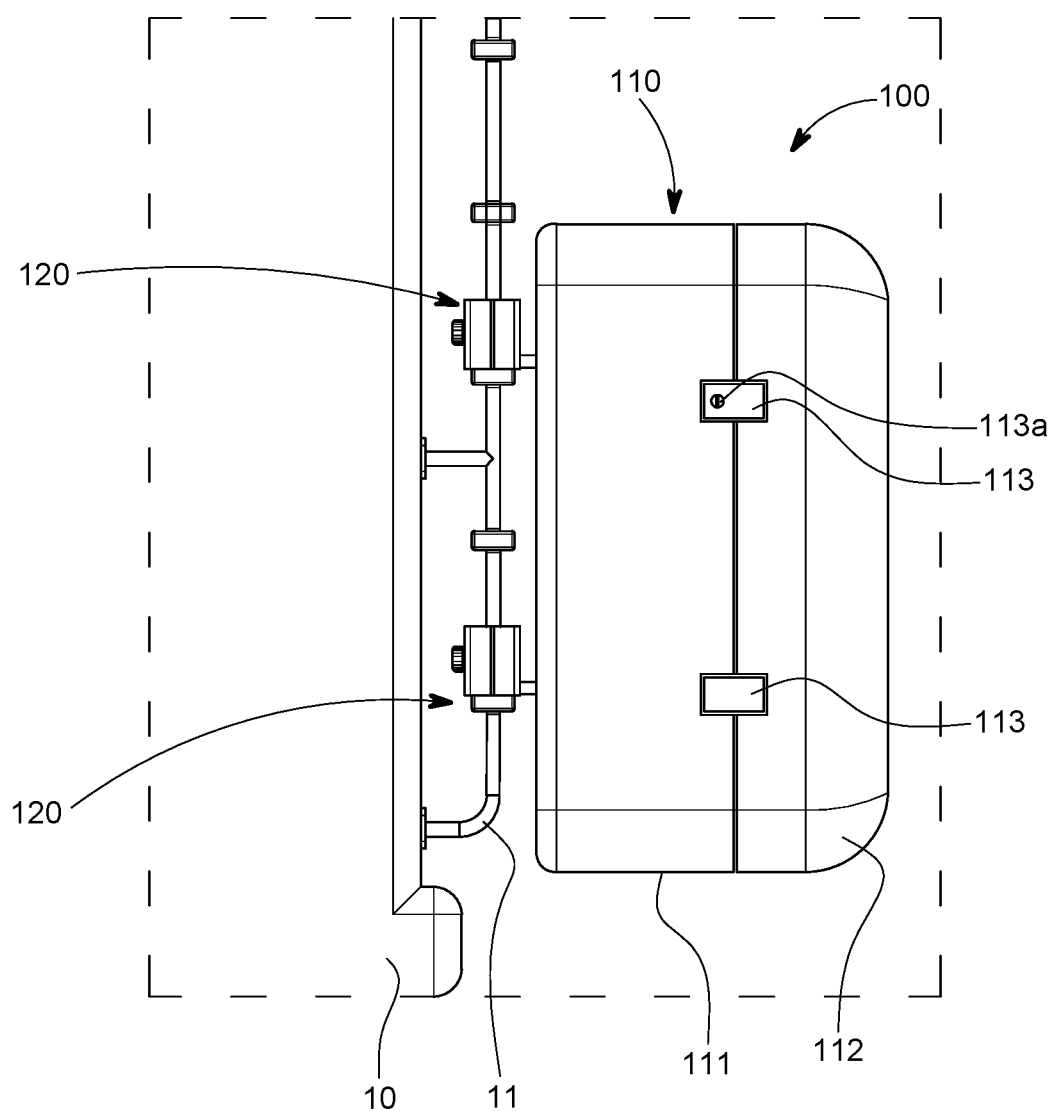
FIG. 2 illustrates an elevational side view of the ladder-mounted storage system as disposed on the ladder of the vehicle, according to an exemplary embodiment of the present general inventive concept.

FIG. 2 illustrates an elevational side view of the ladder-mounted storage system 100 as disposed on the ladder 11 of the vehicle 10, according to an exemplary embodiment of the present general inventive concept.

Figure 3:
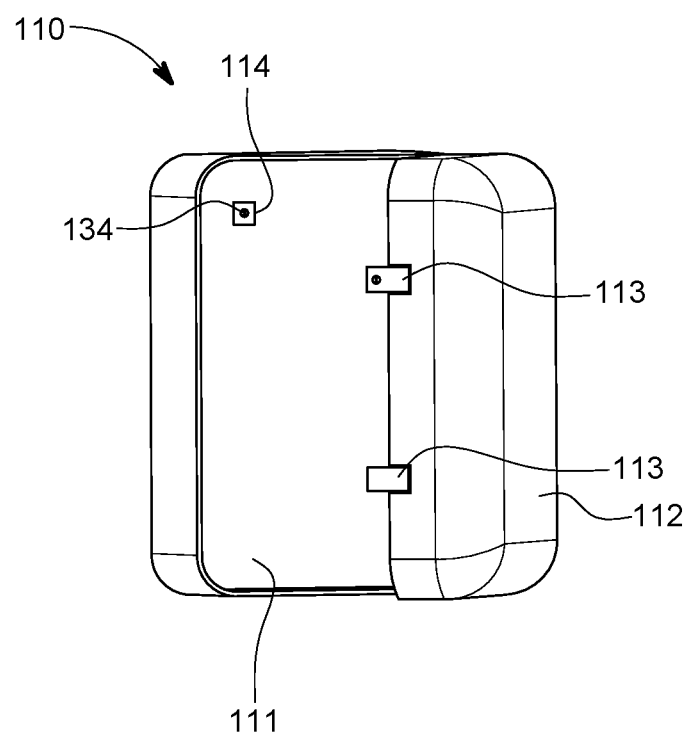
FIG. 3 illustrates a front perspective view of a ladder-mounted storage container in an opened position, according to an exemplary embodiment of the present general inventive concept.

FIG. 3 illustrates a front perspective view of a ladder-mounted storage container 110 in an opened position, according to an exemplary embodiment of the present general inventive concept.

Figure 4A:
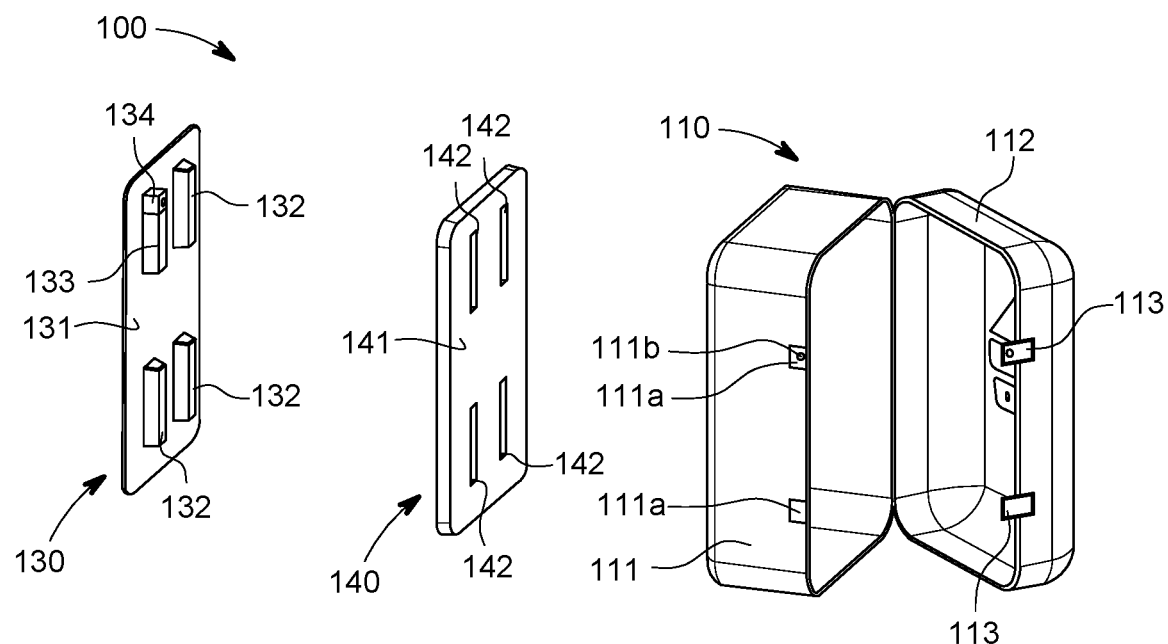
FIG. 4A illustrates an exploded front view of the ladder-mounted storage system, according to an exemplary embodiment of the present general inventive concept.

FIG. 4A illustrates an exploded front view of the ladder-mounted storage system 100, according to an exemplary embodiment of the present general inventive concept.

Figure 4B:
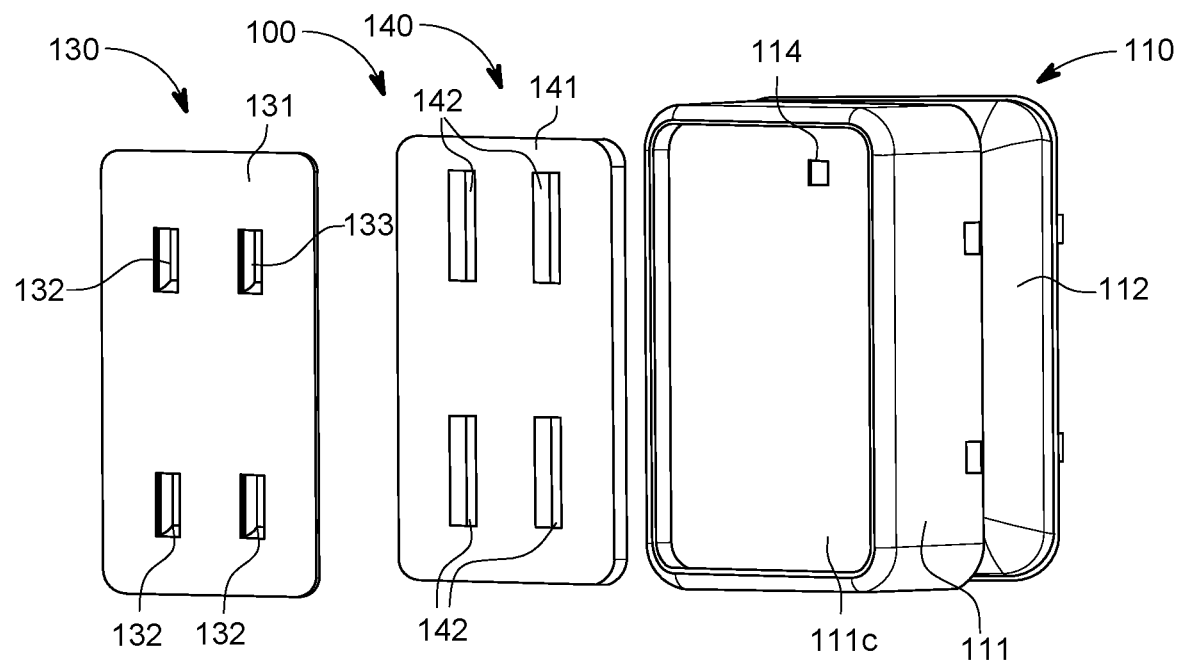
FIG. 4B illustrates an exploded rear view of the ladder-mounted storage system, according to an exemplary embodiment of the present general inventive concept.

FIG. 4B illustrates an exploded rear view of the ladder-mounted storage system 100, according to an exemplary embodiment of the present general inventive concept.

The ladder-mounted storage system 100 may include a ladder-mounted storage container 110, at least one ladder-mount assembly 120, a back plate 130, and a rear barrier 140, but is not limited thereto.

Referring to FIGS. 1 through 4B, the ladder-mounted storage container 110 is illustrated to have a rounded rectangular prism shape. However, the ladder-mounted storage container 110 may be rectangular, circular, conical, triangular, pentagonal, hexagonal, heptagonal, octagonal, or any other shape known to one of ordinary skill in the art, but is not limited thereto.

The ladder-mounted storage container 110 may include a first section 111, a second section 112, a plurality of latches 113, and a mount lock aperture 114, but is not limited thereto.

The first section 111 may receive and/or store at least one item therein.

The first section 111 may include a plurality of latch receiving surfaces 111a, a lock receiving aperture 111b, and a plate receiving recess 111c, but is not limited thereto.

Referring to FIG. 4A, the plurality of latch receiving surfaces 111a may be disposed on at least a portion of an edge of a first side of the first section 111. Each of the plurality of latch receiving surfaces 111a may be recessed with respect to an outer surface of the first section 111. Moreover, each of the plurality of latch receiving surfaces 111a may be distanced from each other.

Referring again to FIG. 4A, the lock receiving aperture 111b may be disposed on at least a portion of at least one of the plurality of latch receiving surfaces 111a.

The plate receiving recess 111c may be a recess on at least a portion of the first section 111 corresponding to a rear side of the first section 111. Specifically, the rear side of the first section 111 may be recessed with respect to an outer surface of the rear side of the first section 111 and/or each edge of the first section 111 surrounding the rear side of the first section 111, such that each edge of the first section 111 may be elevated with respect to the rear side of the first section 111.

The second section 112 may be hingedly disposed at a first side on at least a portion of a second side of the first section 111 opposite with respect to the first side of the first section 111. As such, the second section 112 may operate similar to a barrier (e.g., a door), such that the second section 112 may move (i.e. pivot and/or rotate) from closed in a first position to at least partially opened in a second position, and move from opened in the second position to closed in the first position.

The plurality of latches 113 may be disposed on at least a portion of a second side of the second section 112 opposite with respect to the first side of the second section 112. Each of the plurality of latches 113 may extend away from the second section 112 toward the first section 111 while the second section 112 is closed. Accordingly, each of the plurality of latches 113 may correspond and/or connect to the plurality of latch receiving surfaces 111a. In other words, a number of the plurality of latches 113 may correspond to a number of the plurality of latch receiving surfaces 111a. Also, each of the plurality of latches 113 may be distanced from each other, corresponding to the distance between each of the plurality of latch receiving surfaces 111a.

Each of the plurality of latches 113 may include a lock 113a, but is not limited thereto. The lock 113a may include a zipper, a key lock, an electronic lock (e.g., a biometric lock), a keypad, a combination lock, etc., but is not limited thereto.

The lock 113a may connect to the lock receiving aperture 111b. In other words, the lock receiving aperture 111b may receive the lock 113a therein, such that the lock 113a may lock within the lock receiving aperture 111b and/or prevent the second section 112 from opening until the lock 113a is unlocked.

Referring to FIG. 4B, the mount lock aperture 114 may be disposed on least a portion of the rear side of the first section 111. Additionally, the mount lock aperture 114 may pass through from an outer surface of the rear side of the first section 111 to an interior surface of the rear side of the first section 111 (e.g., space between the first section 111 and/or the second section 112).

Figure 5:
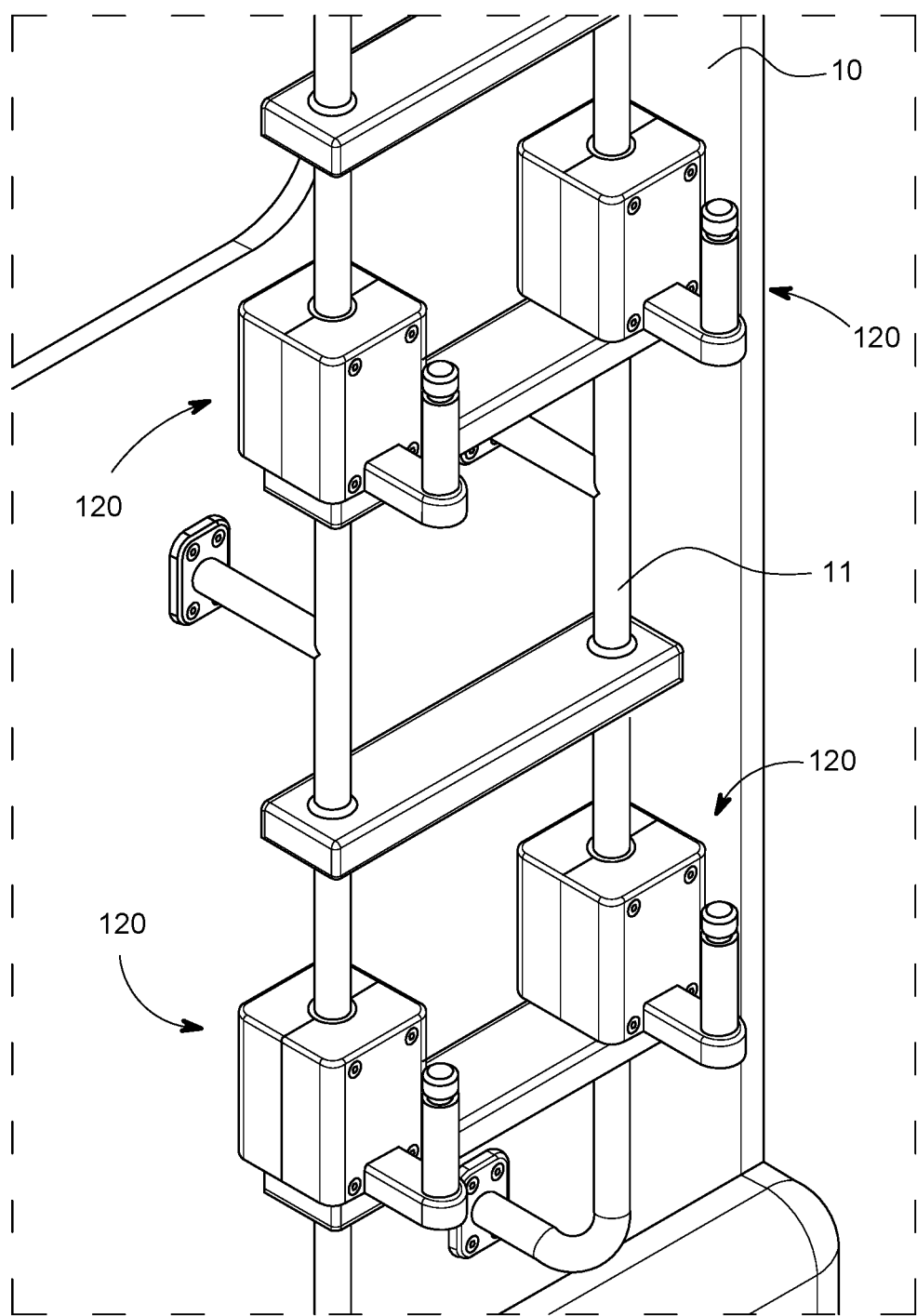
FIG. 5 illustrates a zoomed in view of a ladder-mount assembly as disposed on the ladder of the vehicle, according to an exemplary embodiment of the present general inventive concept.

FIG. 5 illustrates a zoomed in view of a ladder-mount assembly 120 as disposed on the ladder 11 of the vehicle 10, according to an exemplary embodiment of the present general inventive concept.

Figure 6A:
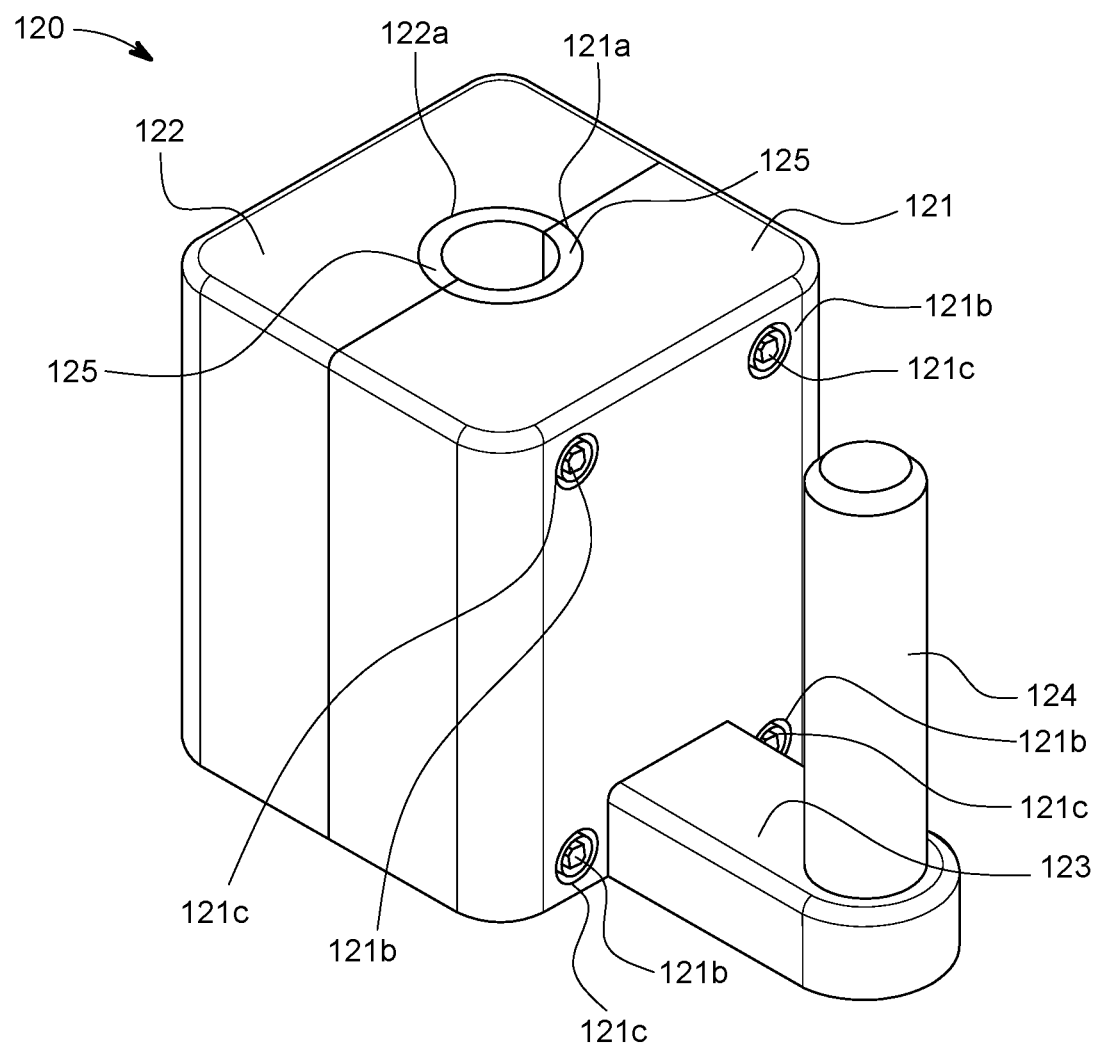
FIG. 6A illustrates an isometric top view of the ladder-mount assembly, according to an exemplary embodiment of the present general inventive concept.

FIG. 6A illustrates an isometric top view of the ladder-mount assembly 120, according to an exemplary embodiment of the present general inventive concept.

Figure 6B:
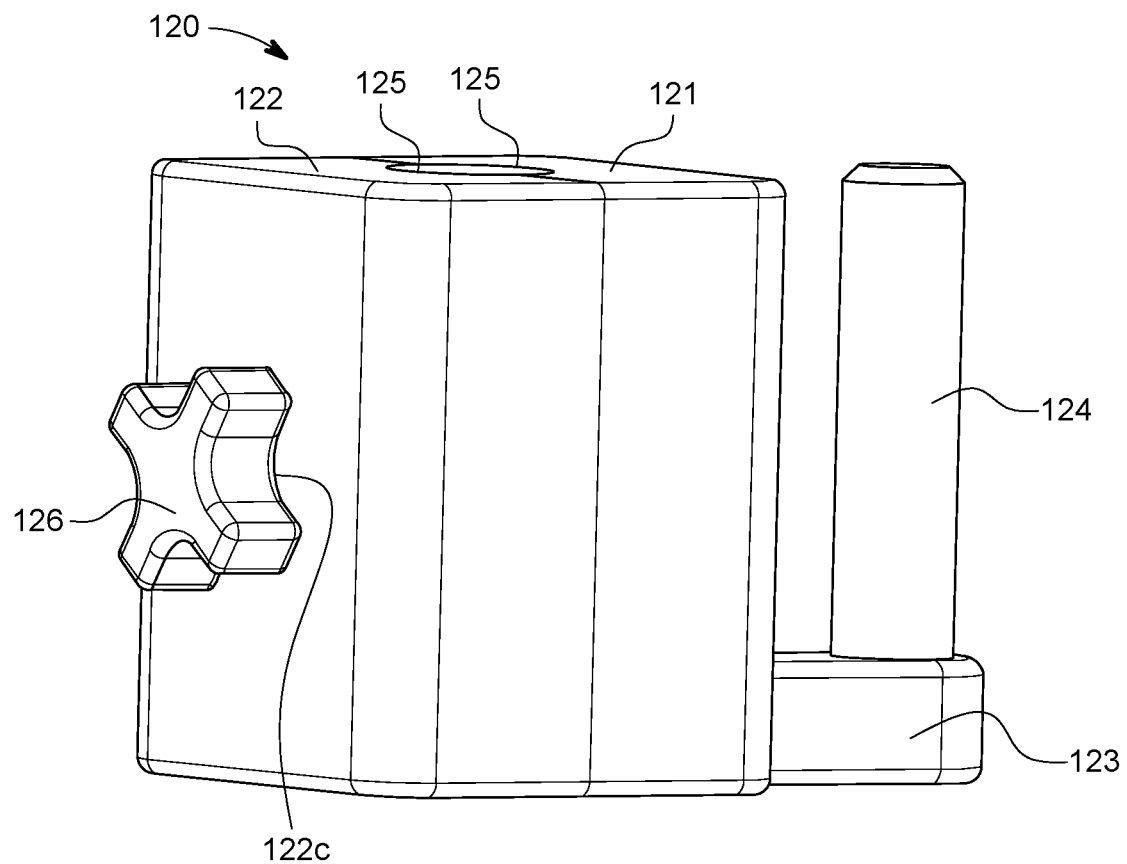
FIG. 6B illustrates a rear perspective view of the ladder-mount assembly, according to an exemplary embodiment of the present general inventive concept.

FIG. 6B illustrates a rear perspective view of the ladder-mount assembly 120, according to an exemplary embodiment of the present general inventive concept.

Figure 6C:
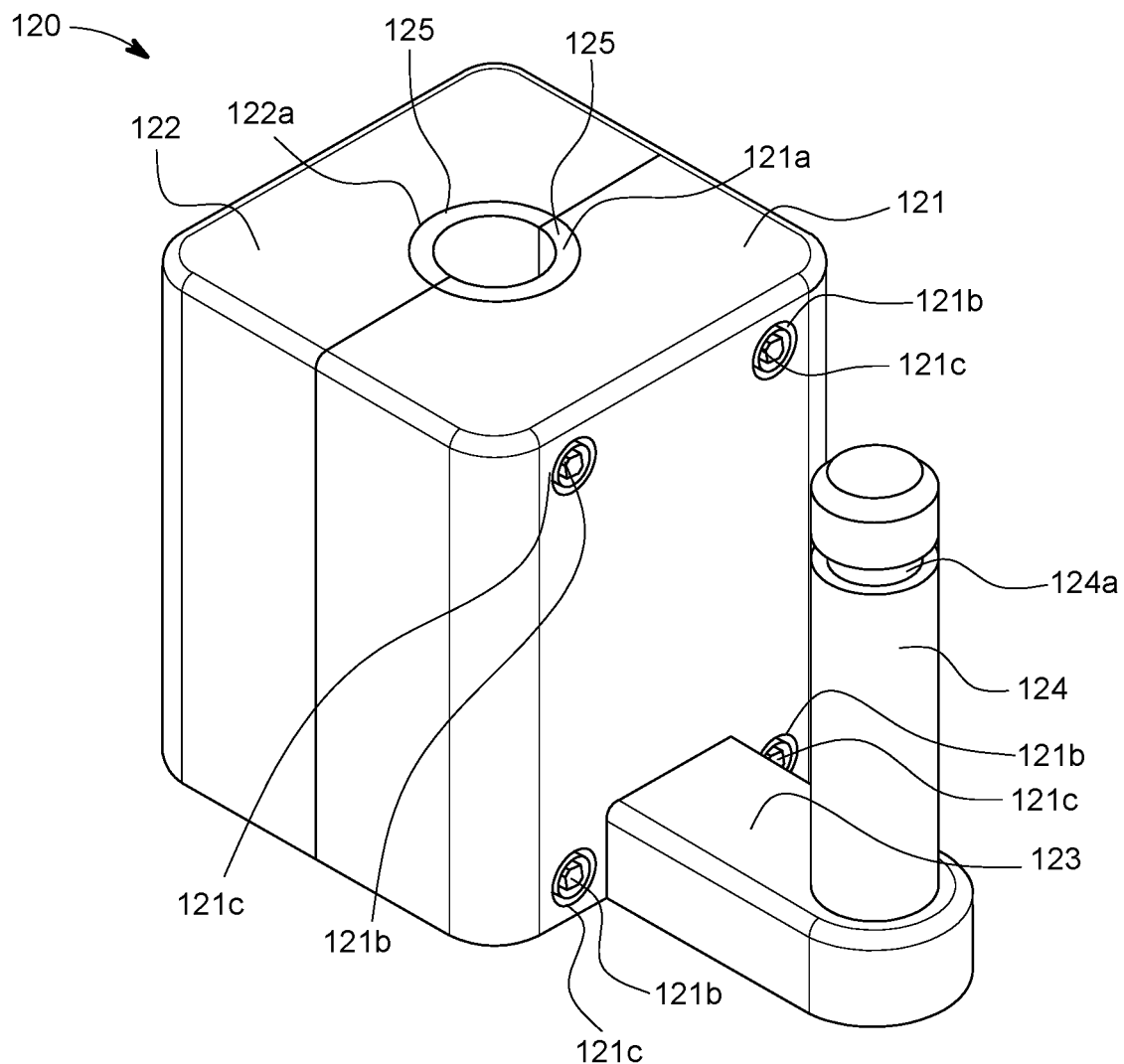
FIG. 6C illustrates an isometric top view of the ladder-mount assembly, according to an exemplary embodiment of the present general inventive concept.

FIG. 6C illustrates an isometric top view of the ladder-mount assembly 120, according to an exemplary embodiment of the present general inventive concept.

Figure 7:
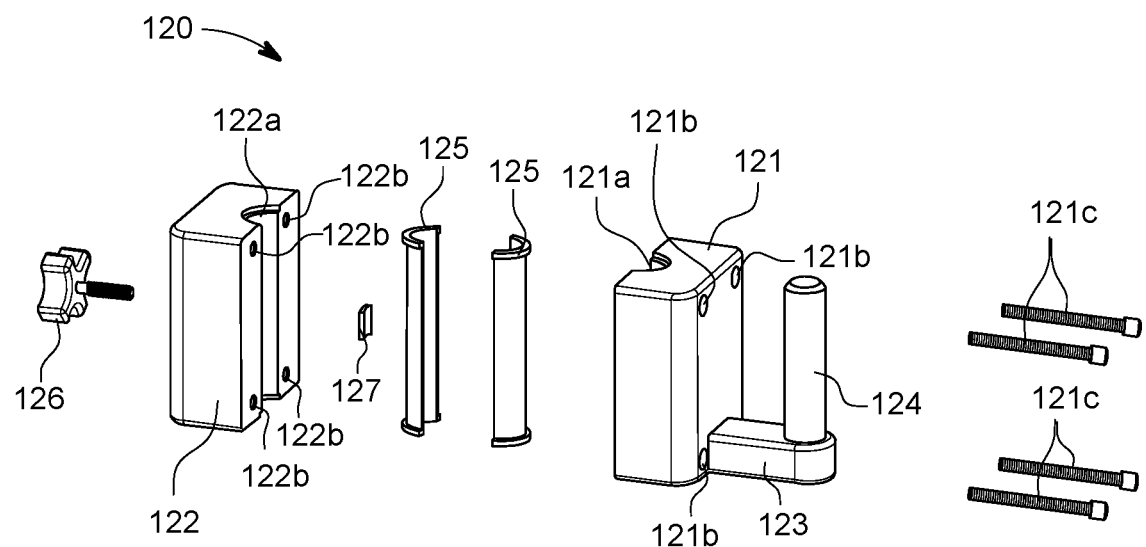
FIG. 7 illustrates an exploded view of the ladder-mount assembly, according to an exemplary embodiment of the present general inventive concept.

FIG. 7 illustrates an exploded view of the ladder-mount assembly 120, according to an exemplary embodiment of the present general inventive concept.

The at least one ladder-mount assembly 120 may include a front section 121, a rear section 122, an extension body 123, a mounting rod 124, a plurality of mounting plates 125, an adjustment knob 126, and a knob pad 127, but is not limited thereto. Alternatively, each of a plurality of ladder-mount assemblies 120 may include all of the above components.

The front section 121 may include a plate receiving groove 121a, a plurality of fastener receiving apertures 121b, and a plurality of mount fasteners 121c, but is not limited thereto.

The plate receiving groove 121a may be disposed on at least a portion of a center of a first side (e.g., an interior surface) of the front section 121. Moreover, the plate receiving groove 121a may be semi-circular shaped.

The plurality of fastener receiving apertures 121b may be disposed on at least a portion of a second side of the front section 121 opposite with respect to the first side of the front section 121. Additionally, each of the plurality of fastener receiving apertures 121b may be disposed at a corner of the second side of the front section 121.

Each of the plurality of mount fasteners 121c may include a screw, a nail, a bolt, a washer, a nut, an adhesive (e.g., tape, glue), a magnet, and/or any combination thereof, but is not limited thereto.

Each of the plurality of mount fasteners 121c may be removably inserted and/or connected to at least one of the plurality of fastener receiving apertures 121b. More specifically, a number of the plurality of mount fasteners 121c may correspond to a number of the plurality of fastener receiving apertures 121b.

The rear section 122 may include a plate receiving groove 122a, a plurality of fastener receiving apertures 122b, and a knob receiving aperture 122c, but is not limited thereto.

The plate receiving groove 122a may be disposed on at least a portion of a center of a first side (e.g., an interior surface) of the rear section 122. Moreover, the plate receiving groove 122a may be semi-circular shaped.

The plurality of fastener receiving apertures 122b may be disposed on at least a portion of the first side of the rear section 122. Additionally, each of the plurality of fastener receiving apertures 122b may be disposed at a corner of the second side of the rear section 122. Furthermore, each of the plurality of fastener receiving apertures 122b may receive at least one of the plurality of mount fasteners 121c therein, such that inserting the plurality of mount fasteners 121c into the plurality of fastener receiving apertures 121b may connect to the plurality of fastener receiving apertures 122b. As such, the number of the plurality of mount fasteners 121c may correspond to a number of the plurality of fastener receiving apertures 122b.

The knob receiving aperture 122c may be disposed on at least a portion of a center of a second side of the rear section 122 opposite with respect to the first side of the rear section 122.

The extension body 123 may be perpendicularly disposed away from the first side of the front section 121 with respect to a first direction. The extension body 123 may extend a predetermined length away from the front section 121.

The mounting rod 124 may be perpendicularly disposed away from the extension body 123 with respect to a second direction different from the first direction, such that the mounting rod 124 may be disposed in parallel with respect to the front section 121 and/or the rear section 122. The mounting rod 124 may be elongate and/or cylindrical.

The mounting rod 124 may include a lock groove 124a, but is not limited thereto.

The lock groove 124a may be circumferentially disposed around at least a portion of the mounting rod 124. In other words, the lock groove 124a may be disposed in a circle around a portion of the mounting rod 124.

At least one of the plurality of mounting plates 125 may be removably disposed on at least a portion of the plate receiving groove 121a and/or the plate receiving groove 122a. In other words, the plate receiving groove 121a and/or the plate receiving groove 122a may receive at least one of the plurality of mounting plates 125a therein.

As such, the plurality of mounting plates 125 may collectively form a tubular, cylindrical structure, such that the plurality of mounting plates 125 may receive and/or removably connect to a rail of a ladder 11 of a vehicle 10 therebetween. Referring to FIGS. 5 through 7, the plurality of mounting plates 125 may resist and/or prevent movement along a rail of the ladder 11.

The adjustment knob 126 may be removably inserted and/or connected to the knob receiving aperture 122c. The adjustment knob 126 may move (i.e. rotate) in a first rotating direction (i.e. clockwise) or a second rotating direction (i.e. counterclockwise) toward the plurality of mounting plates 125 to increase tension of the plurality of mounting plates 125 against the rail of the ladder 11, such that the at least one ladder-mount assembly 120 may be prevented from moving along the ladder 11. Conversely, the adjustment knob 126 move in the second rotating direction or the first rotating direction away from the plurality of mounting plates 125 to decrease tension of the plurality of mounting plates 125 against the rail of the ladder 11, such that the at least one ladder-mount assembly 120 may be moved along the ladder 11.

The knob pad 127 may be disposed on at least a portion of the first side of the rear section 122 and/or an end of the knob receiving aperture 122c. The knob pad 127 may cushion and/or absorb an impact from the adjustment knob 126 in response to contact from the adjustment knob 127. As such, the knob pad 127 may prevent damage to the plurality of mounting plates 125 and/or the rail of the ladder 11 in response to the adjustment knob 126 increasing tension of the plurality of mounting plates 125 against the rail of the ladder 11.

The at least one ladder-mount assembly 120 may be removed and mounted to any other portion of the ladder 11.

Figure 8A:
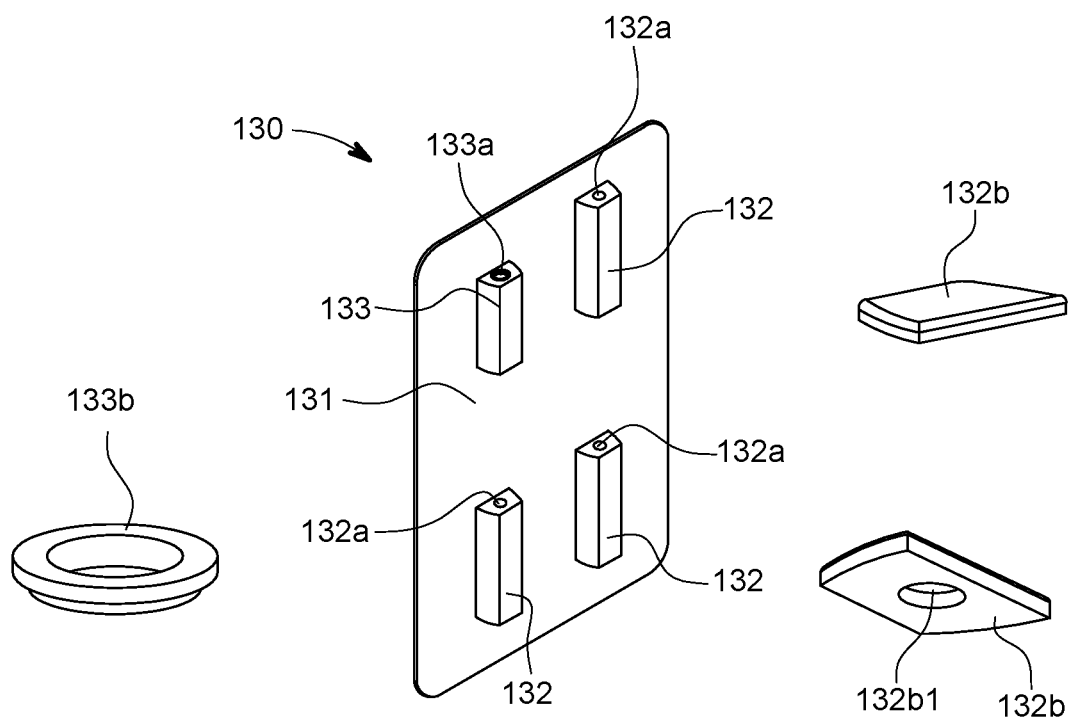
FIG. 8A illustrates a front perspective view of a back plate, according to an exemplary embodiment of the present general inventive concept.

FIG. 8A illustrates a front perspective view of a back plate 130, according to an exemplary embodiment of the present general inventive concept.

Figure 8B:
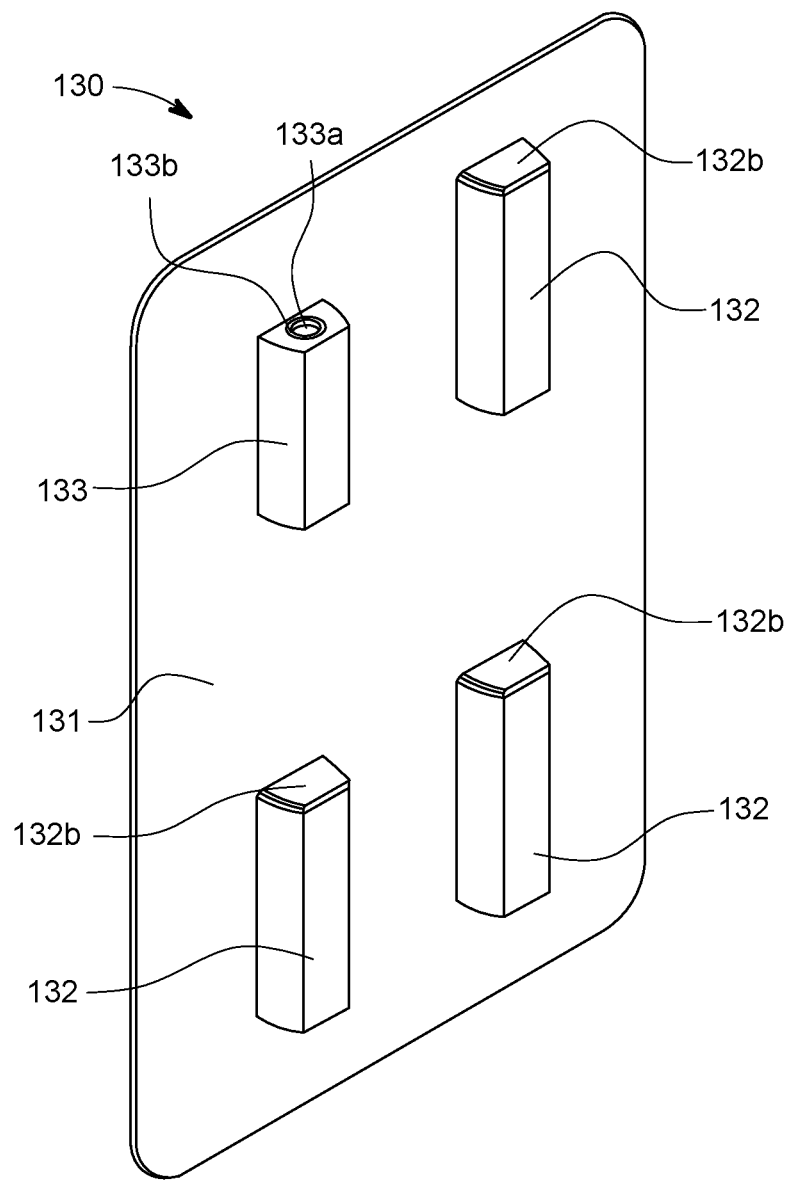
FIG. 8B illustrates a front perspective view of the back plate, according to an exemplary embodiment of the present general inventive concept.

FIG. 8B illustrates a front perspective view of the back plate 130, according to an exemplary embodiment of the present general inventive concept.

Figure 8C:
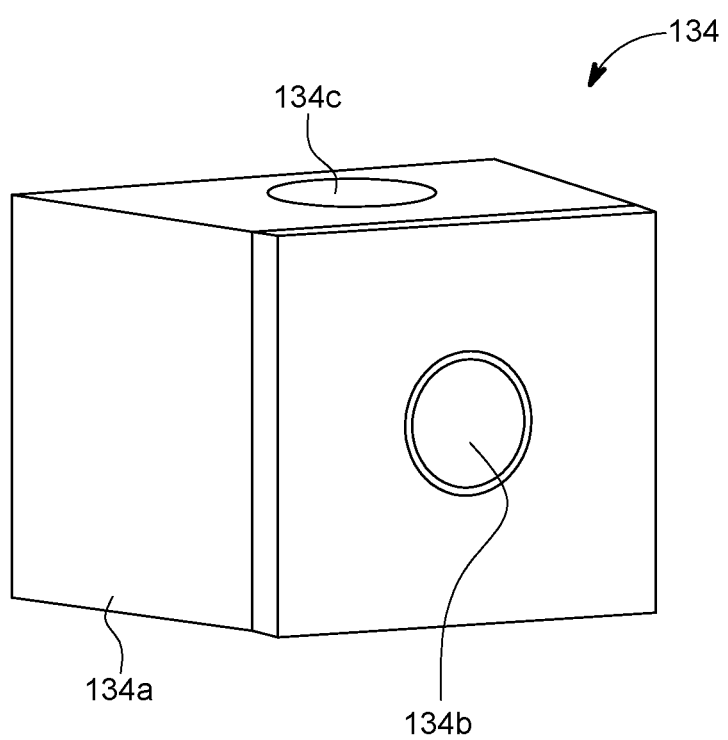
FIG. 8C illustrates a zoomed in bottom perspective view of a mount lock cap 134, according to an exemplary embodiment of the present general inventive concept.

FIG. 8C illustrates a zoomed in bottom perspective view of a mount lock cap 134, according to an exemplary embodiment of the present general inventive concept.

The back plate 130 may include a plate body 131, a plurality of rod receiving grooves 132, a mount lock groove 133, and a mount lock cap 134, but is not limited thereto.

Referring to FIGS. 8A and 8B, the plate body 131 is illustrated to have a rounded rectangular prism shape. However, the plate body 131 may be rectangular, circular, conical, triangular, pentagonal, hexagonal, heptagonal, octagonal, or any other shape known to one of ordinary skill in the art, but is not limited thereto.

Furthermore, the plate body 131 may correspond in shape to the plate receiving recess 111c of the first section 111.

Each of the plurality of rod receiving grooves 132 may include a tool receiving aperture 132a and a rod cap 132b, but is not limited thereto.

The plurality of rod receiving grooves 132 may be disposed on at least a portion of the plate body 131. Moreover, a number and/or a position of the plurality of rod receiving grooves 132 may correspond to a number and/or a position of the at least one ladder-mount assembly 120. Specifically, each of the plurality of rod receiving grooves 132 may receive the mounting rod 124 therein. However, the plurality of rod receiving grooves 132 may have one less than the number of the at least one ladder-mount assembly 120.

The tool receiving aperture 132a may be disposed on at least a portion of an end of each of the plurality of rod receiving grooves 132. The tool receiving aperture 132a may receive a tool therein, such as for adjustments to the mounting rod 124 within each of the plurality of rod receiving grooves 132.

The rod cap 132b may include a cap recess 132b1, but is not limited thereto.

The rod cap 132b may be removably disposed on at least a portion of the end of each of the plurality of rod receiving grooves 132. Additionally, the rod cap 132b may at least partially cover the mounting rod 124 within each of the plurality of rod receiving grooves 132. Furthermore, the cap recess 132b1 may receive and/or connect to an end of the mounting rod 124 therein.

The mount lock groove 133 may include a protrusion aperture 133a and a seal 133b, but is not limited thereto.

The mount lock groove 133 may be disposed on at least a portion of the plate body 131. Referring again to FIGS. 8A and 8B, the mount lock groove 133 may have a size and/or a length less than a size and/or a length of each of the plurality of rod receiving grooves 132.

The mount lock groove 133 may receive the mounting rod 124 therein. However, the mount lock groove 133 may differ from each of the plurality of rod receiving grooves 132 due to the length. Also, the protrusion aperture 133a may be disposed on an end of the mount lock 133. The protrusion aperture 133a may receive the end of the mounting rod 124 therethrough, such that that the lock groove 124a may be at least partially exposed through the protrusion aperture 133a. In other words, the end of the mounting rod 124 and/or the lock groove 124a may be inserted through the protrusion aperture 133a, such that the end of the mounting rod 124 may be visible.

It is important to note that plurality of rod receiving grooves 132 may not provide the same function. In particular, the end of the mounting rod 124 and/or the lock groove 124a may not be at least partially exposed through the tool receiving aperture 132a, nor would the end of the mounting rod 124 be visible.

The seal 133b may be removably disposed within at least a portion of the protrusion aperture 133a. The seal 133b may prevent weather interference (e.g., rain, snow, ice, sleet, etc.) and/or damage within the protrusion aperture 133a and/or the mount lock groove 133.

The mount lock cap 134 may include a cap body 134a, a lock 134b, and a cap aperture 134c, but is not limited thereto.

The cap body 134a may have a size and/or a shape to increase a length of the mount lock groove 133 to be similar to a length of each of the plurality of rod receiving grooves 132. In other words, referring again to FIG. 4A, the length of the mount lock groove combined with the cap body 134a may be similar to the length of each of the plurality of rod receiving grooves 132. The cap body 134a may be removably disposed on at least a portion of the end of the mount lock groove 133. Additionally, the cap body 134a may at least partially cover the mounting rod 124 and/or the lock groove 124a.

The lock 134b may include a zipper, a key lock, an electronic lock (e.g., a biometric lock), a keypad, a combination lock, etc., but is not limited thereto.

The lock 134b may be disposed on at least a portion of the cap body 134a. The lock 134b may operate as a latch, such that the lock groove 124a may receive the lock 134 therein (e.g., a latch that extends within the lock groove 124a). As such, the lock 134 may lock within the lock groove 124a and/or prevent the mounting rod 124 from being removed from the mount lock groove 133 until the lock 134b is unlocked.

The cap aperture 134c may receive the and/or connect to the end of the mount rod 124 and/or the lock groove 124a therein.

The rear barrier 140 may include a foam body 141 and a plurality of mount receiving apertures 142, but is not limited thereto.

Referring again to FIGS. 4A and 4B, the foam body 141 is illustrated to have a rounded rectangular prism shape. However, the foam body 141 may be rectangular, circular, conical, triangular, pentagonal, hexagonal, heptagonal, octagonal, or any other shape known to one of ordinary skill in the art, but is not limited thereto.

Furthermore, the foam body 141 may correspond in shape to the plate receiving recess 111c of the first section 111. The foam body 141 may absorb an impact during mounting of the ladder-mounted storage container 110.

The plurality of mount receiving apertures 142 may be disposed on at least a portion of the foam body 141. Moreover, a number and/or a position of the plurality of mount receiving apertures 142 may correspond to the number and/or the position of the plurality of rod receiving grooves 132 and/or the mount lock groove 133. Specifically, each of the plurality of mount receiving apertures 142 may receive the at least one of the plurality of rod receiving grooves 132 and/or the mount lock 133 therethrough.

Accordingly, the foam body 141 may be disposed on at least a portion of the rear side of the first section 111 between the rear side of the first section 111 and/or the plate body 131. More specifically, the foam body 141 may be disposed within the plate receiving recess 111c. Subsequently, the plate body 131 may be disposed on the foam body 141 and/or cover the foam body 141, such that the plate body 131 is flush with the rear side and/or each edge of the rear side of the first section 111.

During use, the at least one ladder mount assembly 120 may be connected and/or mounted to the rail of the ladder 11. Referring again to FIG. 5, the at least one ladder mount assembly 120 may be disposed, such that a step of the ladder 11 may be stepped on by a user.

The ladder-mounted storage container 110 may be connected to the at least one ladder mount assembly 120 and/or a plurality thereof as shown in FIG. 5) via the back plate 130 by connecting the mounting rod 124 into each of the plurality of rod receiving grooves 132 and/or the mount lock groove 133. Moreover, the at least one ladder mount assembly 120 may removably connect to the ladder 11.

Additionally, the lock 134b of the mount lock cap 134 may be aligned with the mount lock aperture 114. In other words, the lock 134b may be accessible from within (i.e. an interior) of the ladder-mounted storage container 110. Therefore, the ladder-mounted storage container 110 may be locked onto the at least one ladder mount assembly 120 while the ladder-mounted storage container 110 is disposed on the at least one ladder mount assembly 120. Furthermore, the ladder-mounted storage container 110 may not be removed without accessing the interior of the ladder-mounted storage container 110. As such, only an authorized user that may unlock the lock 113a to open the second section 112 has access to the lock 134b through the mount lock aperture 114.

Therefore, the ladder-mounted storage system 100 may expand storage space for the vehicle 10 by allowing the ladder-mounted storage container 110 to be mounted on the ladder 11. Also, the ladder-mounted storage system 100 may be customized with different types of the ladder-mounted storage container 110. For example, the ladder-mounted storage container 110 may store food, gas tanks, chairs, camping items, propane tanks, a propane fire ring, a barbecue stove, and a cornhole game.

Figure 9A:
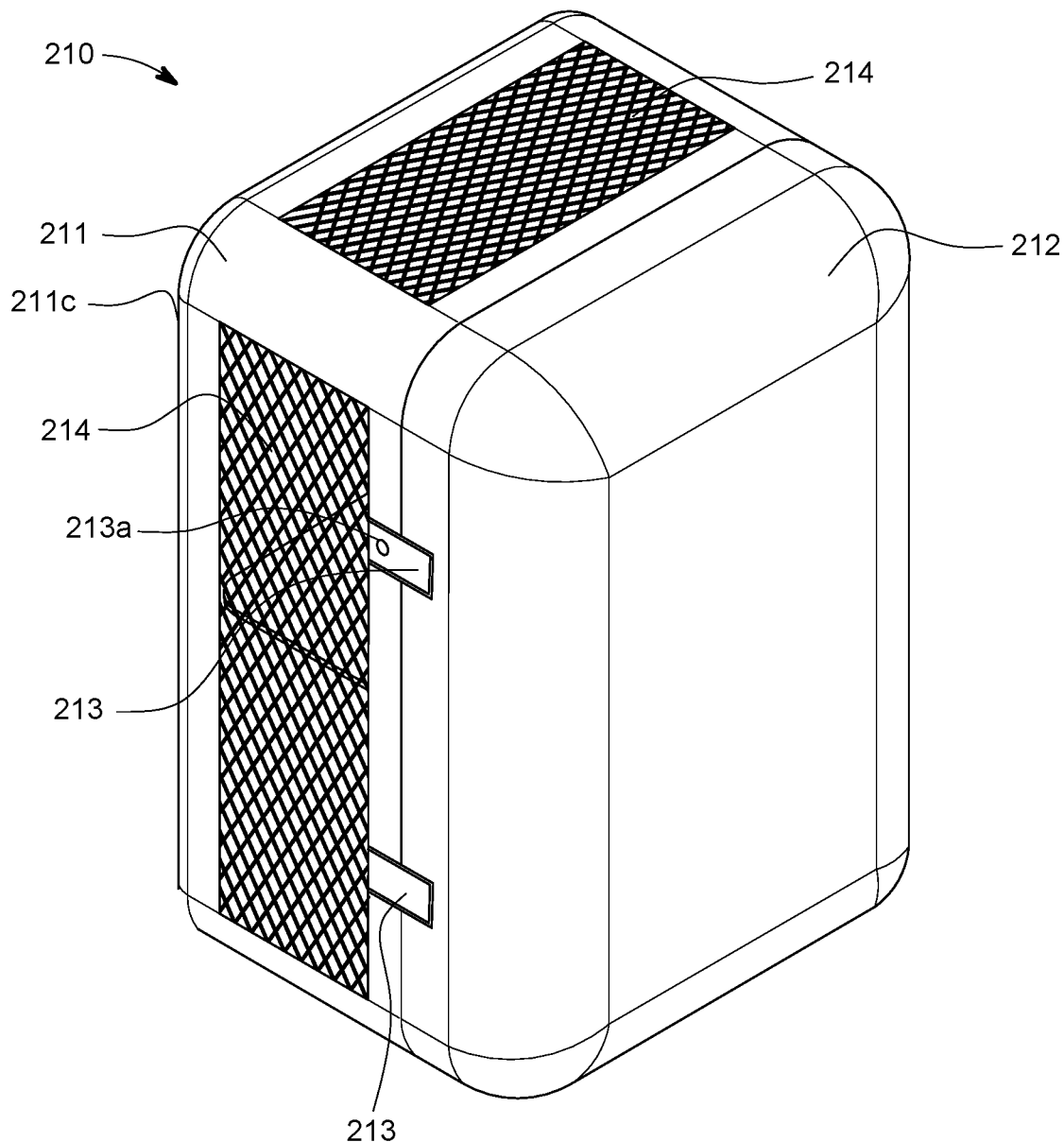
FIG. 9A illustrates an isometric top view of a ladder-mounted storage container, according to another exemplary embodiment of the present general inventive concept.

FIG. 9A illustrates an isometric top view of a ladder-mounted storage container 210, according to another exemplary embodiment of the present general inventive concept.

Figure 9B:
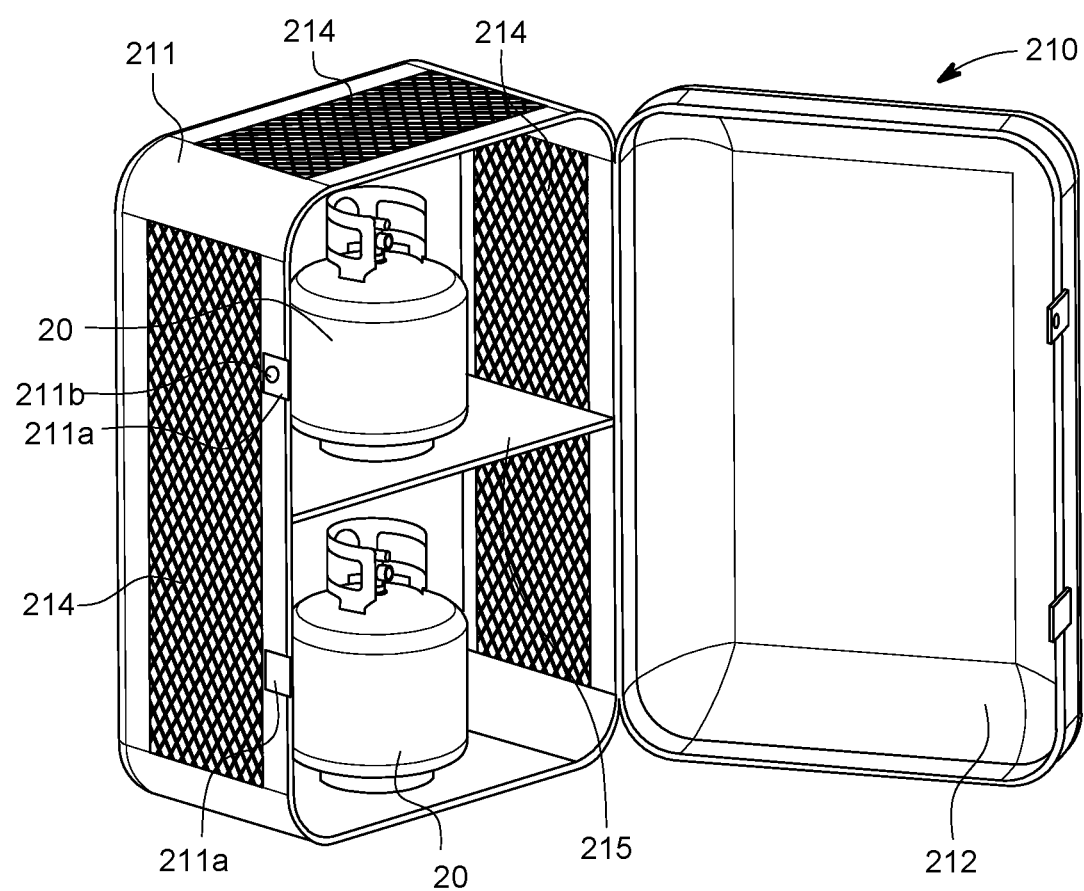
FIG. 9B illustrates a front perspective view of the ladder-mounted storage container in an opened position, according to another exemplary embodiment of the present general inventive concept.

FIG. 9B illustrates a front perspective view of the ladder-mounted storage container 210 in an opened position, according to another exemplary embodiment of the present general inventive concept.

Figure 9C:
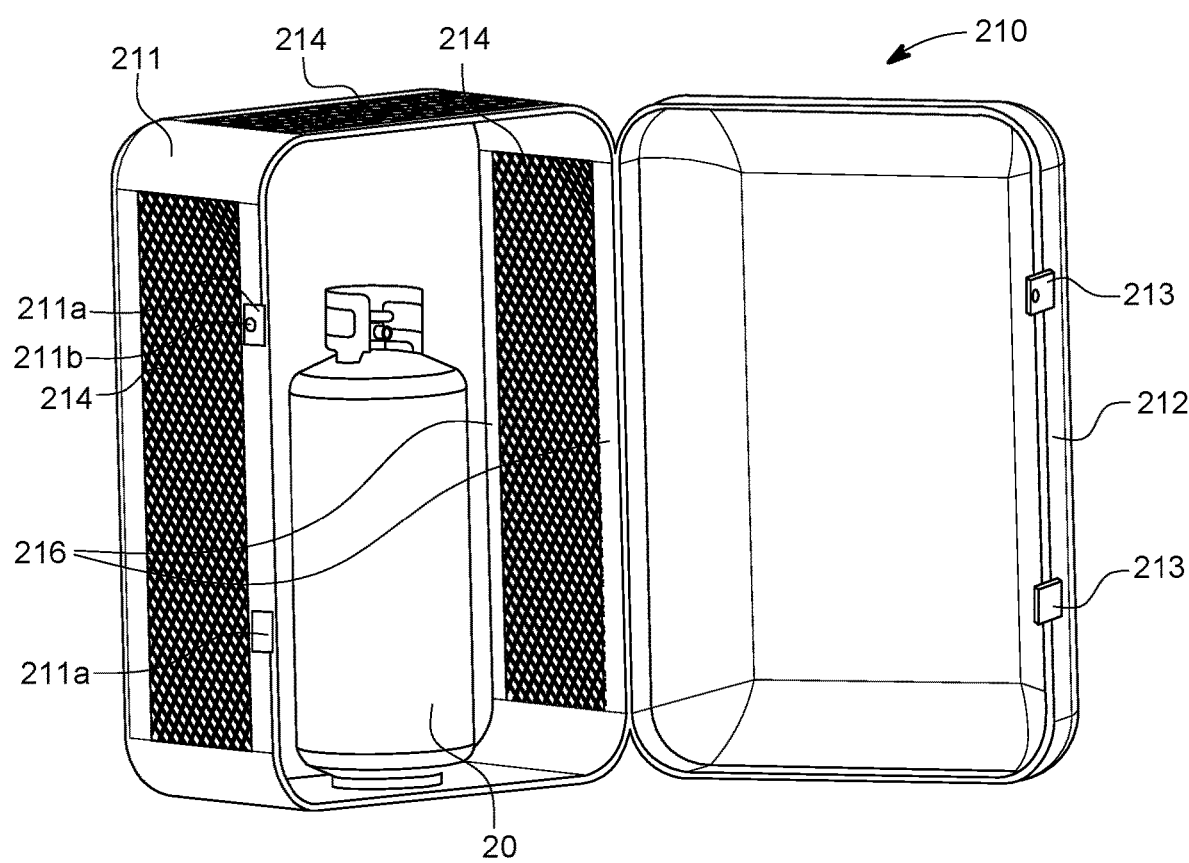
FIG. 9C illustrates a front perspective view of the ladder-mounted storage container in the opened position, according to another exemplary embodiment of the present general inventive concept.

FIG. 9C illustrates a front perspective view of the ladder-mounted storage container 210 in the opened position, according to another exemplary embodiment of the present general inventive concept.

It is important to note that the ladder-mounted storage container 210 may be constructed nearly identical and similar to the ladder-mounted storage container 110. As such, the ladder-mounted storage container 210 may have similar components as the ladder-mounted storage container 110 with slight differences as described herein.

The ladder-mounted storage container 210 may include a first section 211, a second section 212, a plurality of latches 213, a plurality of mesh surfaces 214, at least one shelf 215, and a plurality of shelf receiving notches 216, but is not limited thereto.

The first section 211 may receive and/or store at least one item therein.

The first section 211 may include a plurality of latch receiving surfaces 211a, a lock receiving aperture 211b, and a plate receiving recess 211c, but is not limited thereto.

Referring to FIGS. 9A through 9C, the plurality of latch receiving surfaces 211a may be disposed on at least a portion of an edge of a first side of the first section 211. Each of the plurality of latch receiving surfaces 211a may be recessed with respect to an outer surface of the first section 211. Moreover, each of the plurality of latch receiving surfaces 211a may be distanced from each other.

Referring again to FIGS. 9B and 9C, the lock receiving aperture 211b may be disposed on at least a portion of at least one of the plurality of latch receiving surfaces 211a.

The plate receiving recess 211c may be a recess on at least a portion of the first section 211 corresponding to a rear side of the first section 211. Specifically, the rear side of the first section 211 may be recessed with respect to an outer surface of the rear side of the first section 211 and/or each edge of the first section 211 surrounding the rear side of the first section 211, such that each edge of the first section 211 may be elevated with respect to the rear side of the first section 211.

The second section 212 may be hingedly disposed at a first side on at least a portion of a second side of the first section 211 opposite with respect to the first side of the first section 211. As such, the second section 212 may operate similar to a barrier (e.g., a door), such that the second section 212 may move (i.e. pivot and/or rotate) from closed in a first position to at least partially opened in a second position, and move from opened in the second position to closed in the first position.

The plurality of latches 213 may be disposed on at least a portion of a second side of the second section 212 opposite with respect to the first side of the second section 212. Each of the plurality of latches 213 may extend away from the second section 212 toward the first section 211 while the second section 212 is closed. Accordingly, each of the plurality of latches 213 may correspond and/or connect to the plurality of latch receiving surfaces 211a. In other words, a number of the plurality of latches 213 may correspond to a number of the plurality of latch receiving surfaces 211a. Also, each of the plurality of latches 213 may be distanced from each other, corresponding to the distance between each of the plurality of latch receiving surfaces 211a.

Each of the plurality of latches 213 may include a lock 213a, but is not limited thereto. The lock 213a may include a zipper, a key lock, an electronic lock (e.g., a biometric lock), a keypad, a combination lock, etc., but is not limited thereto.

The lock 213a may connect to the lock receiving aperture 211b. In other words, the lock receiving aperture 211b may receive the lock 213a therein, such that the lock 213a may lock within the lock receiving aperture 211b and/or prevent the second section 212 from opening until the lock 213a is unlocked.

Referring to FIGS. 9A through 9C, the plurality of mesh surfaces 214 may be disposed on least a portion of the first side, the second side, a third side, and a fourth side of the first section 211. The third side and/or the fourth side of the first section 211 may be disposed in parallel with respect to each other, and perpendicularly disposed with respect to the first side and/or the second side. Moreover, the plurality of mesh surfaces 214 may facilitate movement of air therethrough. For example, each of the plurality of mesh surfaces may be a mesh to allow to move therethrough, such that a gas container 20 may leak through each of the plurality of mesh surfaces 214.

The at least one shelf 215 may be removably connected to at least a portion of a center of an interior of the first section 211. The at least one shelf 215 may receive the gas container 20 and/or any other item thereon.

The plurality of shelf receiving notches 216 may be disposed within at least a portion of the interior of the first section 211. The plurality of shelf receiving notches 216 may receive the at least one shelf 215 thereon. In other words, the plurality of shelf receiving notches 216 may support the at least one shelf 215.

Therefore, the ladder-mounted storage system 100 may expand storage space for the vehicle 10 by allowing the ladder-mounted storage container 210 to be mounted on the ladder 11. For example, the ladder-mounted storage container 210 may store food, gas tanks, chairs, camping items, propane tanks, a propane fire ring, a barbecue stove, and a cornhole game.

The present general inventive concept may include a ladder-mounted storage system 100, including a ladder-mounted storage container 110 to store at least one item therein; and a plurality of ladder-mount assemblies 120 to removably connect to a ladder 11 of a vehicle 10 and receive the ladder-mount storage container 110 thereon.

The ladder-mounted storage container 110 may include a first section 111, and a second section 112 hingedly disposed on at least a portion of the first section 111 to move from closed in a first position to at least partially opened in a second position, and move from opened in the second position to closed in the first position.

The first section 111 may include a plurality of latch receiving surfaces 111a disposed on at least a portion of the first section 111, a lock receiving aperture 111b disposed on at least a portion of at least one of the plurality of latch receiving surfaces 111a, and a plate receiving recess 111c disposed on at least a portion of a rear side of the first section 111, such that the plate receiving recess 111c is recessed with respect to an outer surface of the rear side of the first section 111 and each edge of the first section 111 surrounding the rear side of the first section 111.

The ladder-mounted storage container 110 may further include a plurality of latches 113 disposed on at least a portion of the second section 112 to connect to the plurality of latch receiving surfaces 111a.

At least one of the plurality of latches 113 may include a lock 113a to connect to the lock receiving aperture 111b, such that the lock 113 prevents the second section 112 from opening until the lock 113 is unlocked.

The ladder-mounted storage container 110 may include a mount lock aperture 114 disposed on least a portion of the ladder-mounted storage container 110 to pass from an outer surface to an interior surface thereof.

Each of the plurality of ladder-mount assemblies 120 may include a front section 121, and a rear section 122 removably connected to at least a portion of the front section 121.

The front section 121 may include a plate receiving groove 121a disposed on at least a portion of the front section 121, a plurality of fastener receiving apertures 121b disposed on at least a portion of the front section 121, and a plurality of mount fasteners 121c to removably insert within at least one of the plurality of fastener receiving apertures 121b.

The rear section 122 may include another plate receiving groove 122a disposed on at least a portion of the rear section 122, another plurality of fastener receiving apertures 122b disposed on at least a portion of the rear section 122, each of the another plurality of fastener receiving apertures 122b to receive at least one of the plurality of mount fasteners 121c therein through the plurality of fastener receiving apertures 121b, and a knob receiving aperture 122c disposed on at least a portion of the rear section 122.

Each of the plurality of ladder-mount assemblies 120 may further include a plurality of mounting plates 125 removably disposed on at least a portion of the plate receiving groove 121a and the another plate receiving groove 122a, an adjustment knob 126 removably connected to the knob receiving aperture 122c to rotate in a first rotating direction toward the plurality of mounting plates 125 to increase tension of the plurality of mounting plates 125 against the rail of the ladder 11, and to rotate in a second rotating direction away from the plurality of mounting plates 125 to decrease tension of the plurality of mounting plates 125 against the rail of the ladder 11, and a knob pad 127 disposed on at least a portion of the rear section 122 and an end of the knob receiving aperture 122c to absorb an impact from the adjustment knob 126 in response to contact from the adjustment knob 126.

Each of the plurality of ladder-mount assemblies 120 may further include an extension body 123 perpendicularly disposed away from the front section 121 with respect to a first direction to extend a predetermined length away from the front section 121, and a mounting rod 124 perpendicularly disposed away from the extension body 123 with respect to a second direction different from the first direction, such that the mounting rod 124 is disposed in parallel with respect to the front section 121 and the rear section 122.

The mounting rod 124 may include a lock groove 124a disposed on at least a portion of the mounting rod 124.

The ladder-mounted storage system 100 may further include a back plate 130 to be disposed on at least a portion of a rear side of the ladder-mounted storage container 110.

The back plate 130 may include a plate body 131, a plurality of rod receiving grooves 132 disposed on at least a portion of the plate body 131, each of the plurality of rod receiving grooves 132 to receive the mounting rod 124 therein, and a mount lock groove 133 disposed on at least a portion of the plate body 131 to receive the mounting rod 124 and the lock groove 124a therethrough.

The mount lock groove 133 may include a protrusion aperture 133a disposed on an end of the mount lock groove 133 to receive an end of the mounting rod 124 and the lock groove 124a therethrough, and a seal 133b removably disposed within at least a portion of the protrusion aperture 133a to prevent damage within the protrusion aperture 133a and the mount lock groove 133.

The back plate 130 may further include a mount lock cap 134 removably connected to at least a portion of the mount lock groove 133 and accessible within the ladder-mounted container storage 110 via the mount lock aperture 114 to lock within the lock groove 124a and prevent the mounting rod 124 from being removed until the mount lock cap 134 is unlocked.

The ladder-mounted storage system 100 may further include a rear barrier 140 disposed within at least a portion of the ladder-mounted storage container 110 to absorb an impact to the ladder-mounted storage container 110 during mounting.

The ladder-mounted storage container 210 may include a plurality of mesh surfaces 214 disposed on least a portion of the ladder-mounted storage container 210 to facilitate movement of air therethrough.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A ladder-mounted storage system, comprising:
a ladder-mounted storage container to store at least one item therein; and
a plurality of ladder-mount assemblies to removably connect to a ladder of a vehicle and receive the ladder-mounted storage container thereon, each of the plurality of ladder-mount assemblies comprising:
a front section,
a rear section removably connected to at least a portion of the front section,
an extension body to extend away from the front section in a first direction, and
a mounting rod to extend away from the extension body in a second direction.

2. The ladder-mounted storage system of claim 1, wherein the ladder-mounted storage container comprises:
a mount lock aperture disposed on least a portion of the ladder-mounted storage container to pass from an outer surface to an interior surface thereof.

3. The ladder-mounted storage system of claim 1, further comprising:
a rear barrier disposed within at least a portion of the ladder-mounted storage container to absorb an impact to the ladder-mounted storage container during mounting.

4. The ladder-mounted storage system of claim 1, wherein the ladder-mounted storage container comprises:
a plurality of mesh surfaces disposed on least a portion of the ladder-mounted storage container to facilitate movement of air therethrough.

5. The ladder-mounted storage system of claim 1, wherein the ladder-mounted storage container comprises:
a first section; and
a second section hingedly disposed on at least a portion of the first section to move from closed in a first position to at least partially opened in a second position, and move from opened in the second position to closed in the first position.

6. The ladder-mounted storage system of claim 5, wherein the first section comprises:
a plurality of latch receiving surfaces disposed on at least a portion of the first section;
a lock receiving aperture disposed on at least a portion of at least one of the plurality of latch receiving surfaces; and
a plate receiving recess disposed on at least a portion of a rear side of the first section, such that the plate receiving recess is recessed with respect to an outer surface of the rear side of the first section and each edge of the first section surrounding the rear side of the first section.

7. The ladder-mounted storage system of claim 6, wherein the ladder-mounted storage container further comprises:
a plurality of latches disposed on at least a portion of the second section to connect to the plurality of latch receiving surfaces.

8. The ladder-mounted storage system of claim 7, wherein at least one of the plurality of latches comprises:
a lock to connect to the lock receiving aperture, such that the lock prevents the second section from opening until the lock is unlocked.

9. The ladder-mounted storage system of claim 1, wherein the front section comprises:
a plate receiving groove disposed on at least a portion of the front section;
a plurality of fastener receiving apertures disposed on at least a portion of the front section; and
a plurality of mount fasteners to removably insert within at least one of the plurality of fastener receiving apertures.

10. The ladder-mounted storage system of claim 9, wherein the rear section comprises:
another plate receiving groove disposed on at least a portion of the rear section;
another plurality of fastener receiving apertures disposed on at least a portion of the rear section, each of the another plurality of fastener receiving apertures to receive at least one of the plurality of mount fasteners therein through the plurality of fastener receiving apertures; and
a knob receiving aperture disposed on at least a portion of the rear section.

11. The ladder-mounted storage system of claim 10, wherein each of the plurality of ladder-mount assemblies further comprises:
a plurality of mounting plates removably disposed on at least a portion of the plate receiving groove and the another plate receiving groove;
an adjustment knob removably connected to the knob receiving aperture to rotate in a first rotating direction toward the plurality of mounting plates to increase tension of the plurality of mounting plates against the rail of the ladder, and to rotate in a second rotating direction away from the plurality of mounting plates to decrease tension of the plurality of mounting plates against the rail of the ladder; and
a knob pad disposed on at least a portion of the rear section and an end of the knob receiving aperture to absorb an impact from the adjustment knob in response to contact from the adjustment knob.

12. The ladder-mounted storage system of claim 1, wherein the mounting rod comprises:
a lock groove disposed on at least a portion of the mounting rod.

13. The ladder-mounted storage system of claim 12, further comprising:
a back plate to be disposed on at least a portion of a rear side of the ladder-mounted storage container.

14. The ladder-mounted storage system of claim 13, wherein the back plate comprises:
a plate body;
a plurality of rod receiving grooves disposed on at least a portion of the plate body, each of the plurality of rod receiving grooves to receive the mounting rod therein; and a mount lock groove disposed on at least a portion of the plate body to receive the mounting rod and the lock groove therethrough.

15. The ladder-mounted storage system of claim 14, wherein the mount lock groove comprises:
    a protrusion aperture disposed on an end of the mount lock groove to receive an end of the mounting rod and the lock groove therethrough; and
    a seal removably disposed within at least a portion of the protrusion aperture to prevent damage within the protrusion aperture and the mount lock groove.

16. The ladder-mounted storage system of claim 14, wherein the back plate further comprises:
    a mount lock cap removably connected to at least a portion of the mount lock groove and accessible within the ladder-mounted container storage via the mount lock aperture to lock within the lock groove and prevent the mounting rod from being removed until the mount lock cap is unlocked.

17. A ladder-mounted storage system, comprising:
    a ladder-mounted storage container to store at least one item therein, the ladder-mounted storage container comprising:
        a first section, comprising:
            a plurality of latch receiving surfaces disposed on at least a portion of the first section,
            a lock receiving aperture disposed on at least a portion of at least one of the plurality of latch receiving surfaces, and
            a plate receiving recess disposed on at least a portion of a rear side of the first section, such that the plate receiving recess is recessed with respect to an outer surface of the rear side of the first section and each edge of the first section surrounding the rear side of the first section; and
    a plurality of ladder-mount assemblies to removably connect to a ladder of a vehicle and receive the ladder-mounted storage container thereon.

* * * * *